L. Bridges,
Burning Hydrocarbon.

Nº 28,805.          Patented June 19, 1860.

Witnesses:
J. W. Coombs
R. S. Spencer

Inventor:
L. Bridges
per Munn & Co
Attorneys

UNITED STATES PATENT OFFICE.

LYMAN BRIDGES, OF CHICAGO, ILLINOIS, ASSIGNOR TO HIMSELF AND N. M. SIMONDS.

IMPROVED HEATING APPARATUS.

Specification forming part of Letters Patent No. 28,805, dated June 19, 1860.

*To all whom it may concern:*

Be it known that I, LYMAN BRIDGES, of Chicago, in the county of Cook and State of Illinois, have invented a new and Improved Apparatus for the Use of Oil or other Liquid Matters as Fuel for Heating Purposes; and I do hereby declare that the following is a full, clear, and exact description of the same, reference being had to the accompanying drawings, forming part of this specification, in which—

Figure 1:
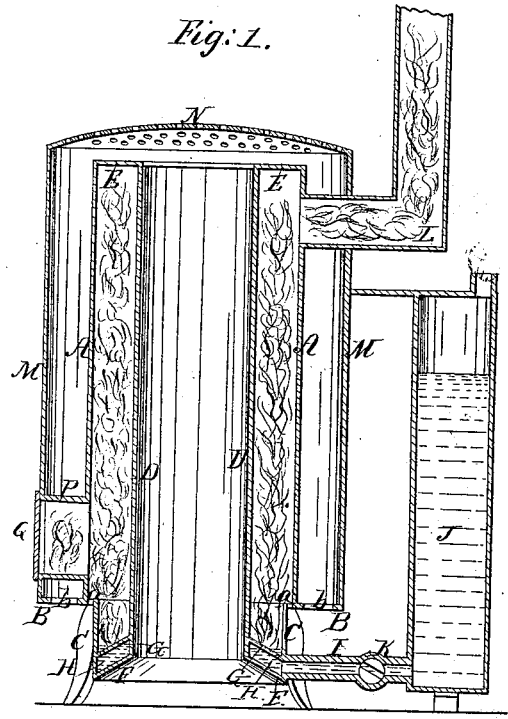
Figure 2:
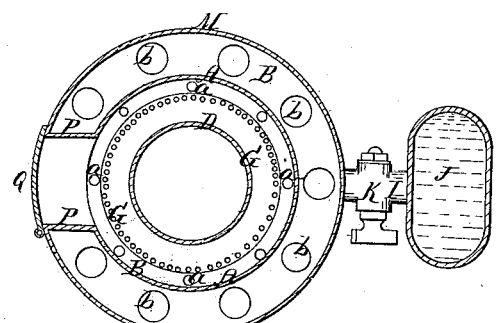

Figure 1 is a vertical section of my apparatus in a form for domestic heating purposes. Fig. 2 is a horizontal section of the same.

Similar letters of reference indicate corresponding parts in both figures.

To enable others skilled in the art to make and use my invention, I will proceed to describe its construction and operation.

A is the main cylinder of the stove arranged vertically and having attached to its lower end by a horizontal annular plate, B, a short smaller cylinder, C.

D is a smaller open cylinder arranged within and concentric with the cylinder A, and extending from a level with the top of the latter down nearly to a level with the bottom of the cylinder C. The top of this cylinder D is connected with the top of A by an annular plate, E, and the bottom of the said cylinder is connected with the bottom of C by a conical plate, F. Above the plate F a perforated conical plate, G, is fitted and secured closely between the cylinders C and D. The space H H between the conical plates F and G constitutes the oil-chamber, and is connected by a pipe, I, with the oil-reservoir J, which stands outside of the stove. This oil-chamber should be high enough for a free flow of oil from it through the pipe I to the chamber H, and the said pipe is fitted with a cock, K, by which the flow may be regulated or shut off.

L is the chimney connecting with the main cylinder A.

M is an outside cylinder connected at its bottom with the bottom of the main cylinder A by the horizontal plate B, and having its upper edges, which extend above the cylinder A, connected with a perforated plate, N, which covers the inner cylinders. The horizontal plate B is provided with openings *a a* between the cylinders A D, and with openings *b b* between the cylinders A M.

P is a door-frame fitted between the cylinders A M, and Q is a door by which the inside of the main cylinder is reached.

The operation is as follows: The reservoir having been filled with coal-oil, or other oil or inflammable liquid, the cock K is opened to admit the oil or liquid to the chamber H of the stove, and as soon as an overflow through the perforations of the plate G commences a light is applied through the door Q to ignite it. Air to support combustion is admitted through the openings *a a*, and the combustion takes place between the cylinders A C D, and any unconsumed smoke, together with the gaseous products of combustion, escape by the chimney L. The cylinders A and D become heated to a high degree, and the air within D and between A and M beoming heated, ascends in regular columns and is delivered through the perforated plate N, a fresh supply of cool air being constantly admitted through the bottom of the cylinder D and through the openings *b b*. When the stove becomes well heated, the oil, as fast as it escapes through the perforated plate, is converted into gas and consumed without producing any or much smoke. The heat is regulated by adjusting the cock K to give a greater or less supply of oil. A wick may be used in the chamber H, if desired; but with coil-oil and some other inflammable liquids it is unnecessary.

What I claim as my invention, and desire to secure by Letters Patent, is—

1. The combination of the oil-reservoir J with the oil-chamber H and cylinders A D, as and for the purpose herein shown and described.

2. The combination of the inclined or conical plates F G, arranged as shown, with the cylinders A D, in the manner and for the purpose herein shown and described.

3. The arrangement and combination, in the manner herein shown and described, of the cylinder M and plates B N with the cylinders A D, so that both surfaces of the combustion-chamber will be protected by ascending columns of air, which will also become heated, all as specified.

LYMAN BRIDGES.

Witnesses:
C. D. WOLF,
SETH TAYLOR,
JOHN W. ROBERTS.